Patented Apr. 14, 1925.

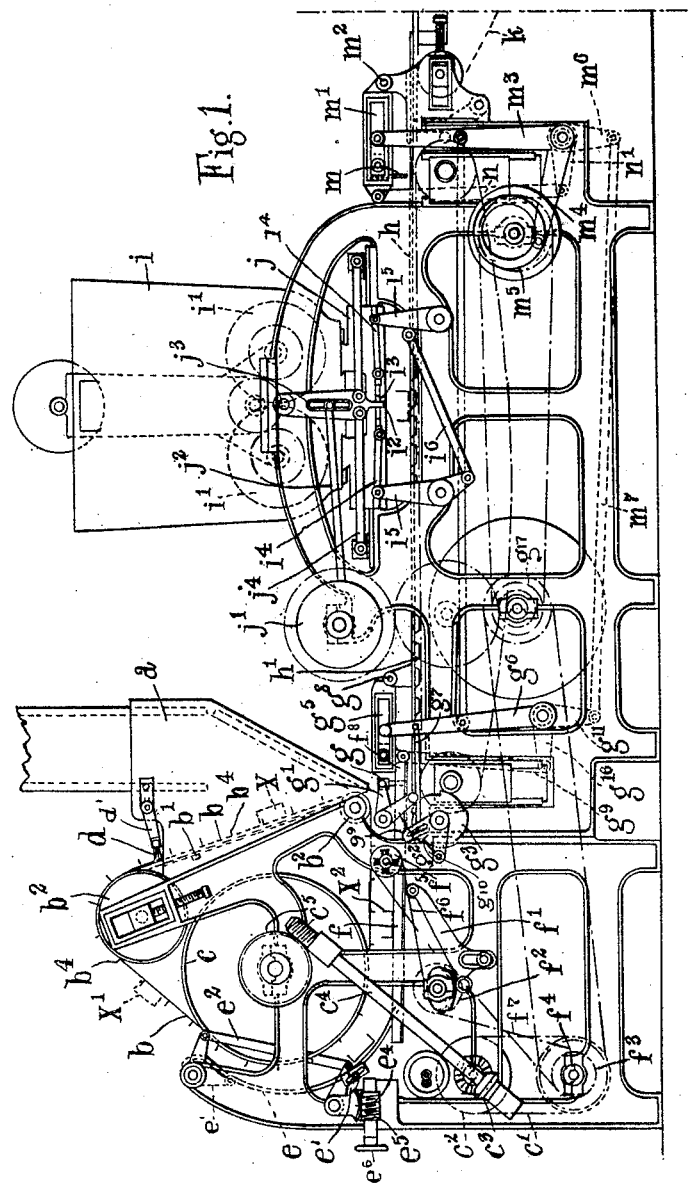

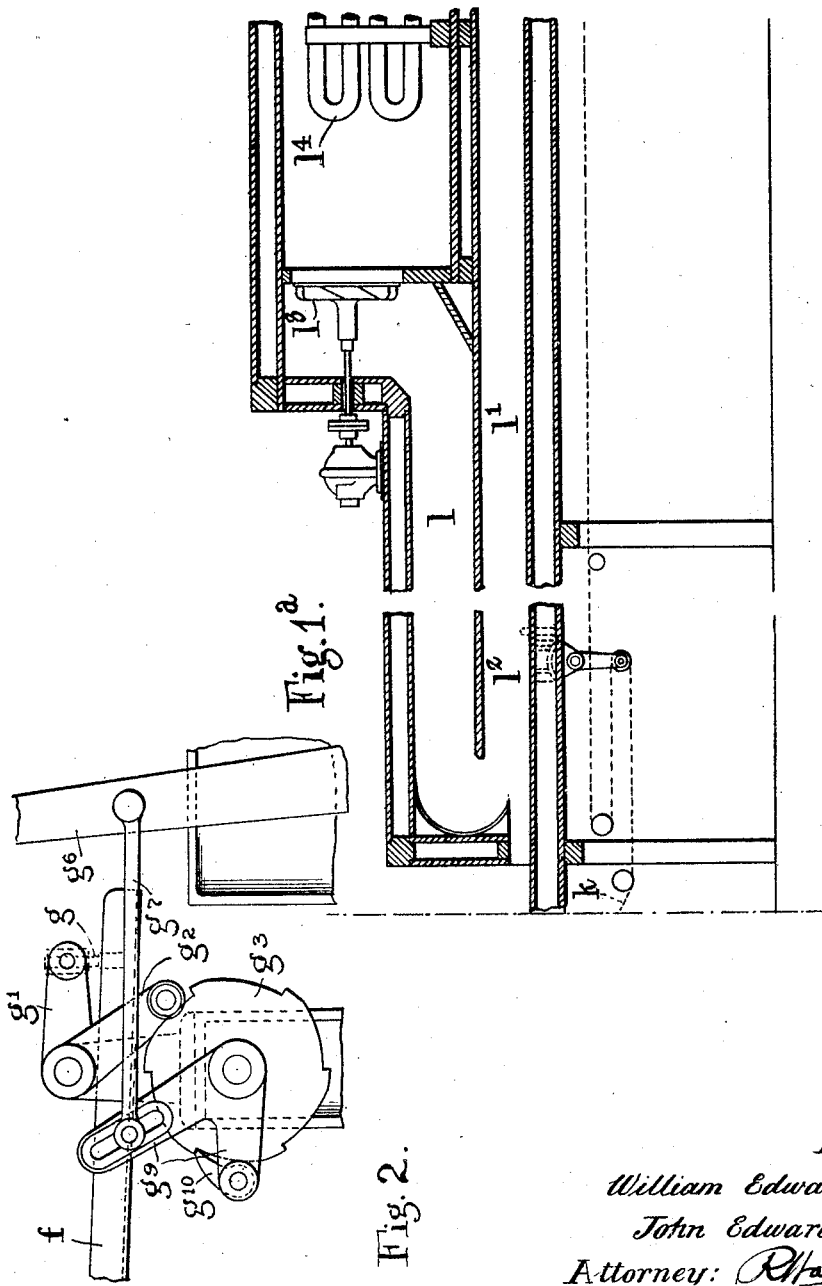

1,533,943

UNITED STATES PATENT OFFICE.

WILLIAM EDWARD PRESCOTT, OF HARLESDEN, LONDON, AND JOHN EDWARD POINTON, OF PETERBOROUGH, ENGLAND, ASSIGNORS TO JOSEPH BAKER, SONS AND PERKINS LIMITED, OF LONDON, ENGLAND, A CORPORATION OF GREAT BRITAIN.

MECHANISM FOR FEEDING AND CONVEYING OPEN RECEPTACLES SUCH AS TINS.

Application filed September 27, 1920. Serial No. 413,225.

*To all whom it may concern:*

Be it known that we, WILLIAM EDWARD PRESCOTT, of Harlesden, London, N. W., England, and JOHN EDWARD POINTON, of Peterborough, in the county of Northants, England, subjects of the King of Great Britain and Ireland, have invented certain new and useful Improvements in Mechanism for Feeding and Conveying Open Receptacles Such as Tins, of which the following is a specification.

This invention relates to mechanism for feeding and conveying open receptacles such as tins which may require filling as by means of an automatic depositing or filling device, for example, for the filling of tins with paste or substance in semi-fluid, liquid, or powder form, and the primary object is to provide a novel and simple form of automatic feeding device by which the receptacles (hereinafter referred to as tins) which are placed pell-mell or haphazard in a hopper or equivalent, will be passed in definite spaced relation to a position where they are filled or charged or otherwise dealt with.

Further objects are to continue the conveyance or feed of the tins after the same are filled and the transfer thereof to other conveying means for conveyance through a cooling or other treating chamber; and further to provide in combination with said feeding and conveying means a depositing device which will receive movement in the same direction and at the same speed as the tins during the filling operation.

According to this invention the feeding means comprises broadly a chamber or hopper for the receptacles containing a conveyor provided with elements adapted to enter the open sides or mouths of the receptacles and convey them open side downwards partially about a revolving member to a position in which they leave said conveyor with their open sides or mouths directed upwards to receive a charge.

The invention further comprises a shaking inclined table onto which the receptacles are fed from the conveyor, which in turn passes them to another conveyor, which leads them to a filling machine, and thence, if desired, to a cooling device.

The invention further comprises details of construction and combination of parts, including novel means for spacing the receptacles all as hereinafter described and specifically pointed out in the appended claims, with reference to the accompanying drawings. In said drawings Fig. 1 is a vertical elevation with parts in section of the feeding devices, filling machine and part of the cooling device, Fig. 1ª is a longitudinal vertical section through the cooler and associated mechanism, and Fig. 2 is a detail elevation.

The apparatus shown in the drawing comprises a hopper $a$ to receive the tins, this hopper preferably having an inclined base. Within said hopper is located part of a conveyor $b$ passing over a board $b^1$ and appropriately formed of an endless band passing about guide rollers above and below, as shown at $b^2$ and $b^3$ respectively, and thence about a drum $c$ or the like of relatively large diameter.

The conveyor is provided on its surface extending into the hopper with a series of studs, projections or the like $b^4$, which engage the open ends or mouths of any tins $x$ which may be positioned in the hopper to receive them and possibly also other tins not so positioned. In the latter case a brush or equivalent $d$, provided at or near the top of the hopper and shown as carried by an arm $d^1$ adjustably mounted on the hopper, will engage such tins and assist in bringing them into proper position to be engaged by the studs, or should the brush fail in this operation, it will return the tins to the hopper. It is immaterial at this stage whether the tins are uniformly collected from the hopper by the studs $b^4$ or not, since they are afterwards aligned or spaced before being filled, as will hereinafter appear. Those tins which have been removed from the hopper are carried along by the studs on the upper run of the conveyor, open side downwards, as shown at $x^1$ and are then carried by said conveyor around the drum, being prevented from falling off the conveyor by a curved guard or shield $e$ partly surrounding or enclosing the drum at a suitable distance from the conveyor. The said guard is adjustable to or from the surface of the drum to provide for tins of different depth, being mounted on cranked arms $e^1$. These arms are connected by a rod $e^2$ to secure simultaneous movement, and the lower arm $e^1$ is connected to an arm $e^4$ moved by a worm gear $e^5$ operated by a hand-wheel $e^6$.

At the end of the guard $e$ the tins, having now been brought with their open sides or mouths uppermost, as shown at $x^2$, are deposited on a plate or table $f$ to which shaking or jogging motion is given as by mounting said plate on arms $f^1$ (one of which is shown) to which vertical vibratory movement is given by a cam or eccentric $f^2$ driven by pulley $f^3$ through crossed belt $f^7$ from the main drive shaft $f^4$. From this latter shaft also rotary movement is shown as given to the drum $c$ by means of belt $c^1$, pulley $c^2$, bevel gears $c^3$, shaft $c^4$ and worm gear $c^5$.

The movements of the plate or table $f$ will compact the tins to some extent, and this plate being also slightly inclined as shown, will cause the tins to be fed down same, but whilst they are being thus fed they are subjected to the action of a rotary brush $f^5$ by means of which they are given a slight forward movement to prevent any crowding of the tins, this brush to some extent spacing the tins and bringing them into alignment or rows. The brush is shown as driven by crossed belt $f^6$ driven from a pulley on the shaft of the eccentric $f^2$.

The tins on the table $f$ pass off the end thereof onto a conveyor $h$ suitably formed of metal slats or laths $h^1$, but before doing so are definitely spaced either in rows or singly by means of a rising and falling gate $g$ (Fig. 2) mounted on pivoted arms $g^1$, one of which is shown, and operated by a lever $g^2$ which engages the ratchet toothed or cammed surface of a rotary disk $g^3$ whereby periodical rising and falling movements are imparted to said gate to release the tins or to arrest same and thus space them at desired distances apart. When lowered this gate arrests the small tins and places them in accurate adjustment. The table $f$ is connected by links $f^8$ to a slide $g^5$ which works in a frame pivoted at $g^8$ and is reciprocated in this frame by a lever $g^6$ to which motion is imparted by arm $g^{16}$ and cam $g^{17}$, so that the table is reciprocated upon the ends of the levers $f^1$ which support and shake it. When the gate has been lowered and has aligned a number of tins the table moves forward, that is to the right of Fig. 1, and at the same time the gate is raised and lowered again. On redescending it lies behind the tins it has previously aligned. The table then moves to the left and the gate pushes the row of tins off it on to the conveyor $h$. Fig. 1 shows the table in its left hand position. The lever $g^6$ is connected by a link $g^7$ to a bell crank lever $g^9$ which actuates the disc $g^3$ by means of the pawl $g^{10}$.

The tins are thus properly fed on to the conveyor $h$ at desired distances apart and aligned to arrive at the correct time and in proper position below a depositing or filling machine to receive their charges of substance therefrom. Such filling machine may be of any desired character but is preferably of a type in which its delivery means is operated in timed relation with the movements of the conveyor and the spacing and aligning gate $g$, and in addition, it is preferred that the delivery means of the filling machine shall have longitudinal movement in the same direction, and at the same speed as the conveyor, so that the movement of the latter can be continuous, and said delivery means moves with the tins whilst the latter are being filled, and then returns to original position ready to fill another tin or batch thereof.

Such a machine, which is of a known type, is shown in outline in the accompanying drawing, and comprises a hopper $i$ for the substance to be fed to the tins, containing rollers $i^1$ which feed the substance to delivery die or dies $i^2$, which is or are opened or closed at desired moments by means of slides $i^3$ actuated by rods $i^4$ and levers $i^5$ coupled by rod $i^6$ for synchronous movement. Reciprocating movement of the die or dies corresponding to the speed of travel of the tins or the conveyor is effected by mounting said dies on a slide $j$ to which movement is imparted from a crank disk $j^1$ through rod $j^2$, swinging frame $j^3$ and links $j^4$.

After the tins have received their charge of substance, they may be transferred to another conveyor $k$ by which they are passed through a cooling device $l$ or otherwise dealt with, and where this latter conveyor is provided, it is preferably driven independently of the slat conveyor $h$, such as by a variable speed drive mechanism.

In transferring the tins to said conveyor $k$, there may be used another device similar to gate $g$ for preserving the spacing of the tins, this additional gate being shown at $m$ mounted in a slide $m^1$ pivoted at $m^2$ and to which reciprocating movement is given by lever $m^3$ rocked by means of an arm $m^4$ engaging a box cam or equivalent $m^5$. The rising and falling movements are imparted to the slide and consequently to the gate by means of a rod $n$ and arm $n^1$ on same shaft as lever $m^3$. Extensions $m^6$ of lever $m^3$ and $g^{11}$ of lever $g^6$ are coupled together by a rod $m^7$ in order that both the gates shall be moved in proper timed relation.

The cooling device $l$ shown is of a known type, comprising a chamber $l^1$ having a hollow table $l^2$ over which the conveyor $k$ passes and which receives some cooling medium, brine pipes $l^4$ being mounted above said chamber, and the cold air circulated in the chamber as by means of a fan $l^3$.

What we claim as our invention and desire to secure by Letters Patent of the United States is:—

1. In mechanism for feeding and conveying open receptacles, the combination of a hopper to receive the receptacles, a conveyor movable in said hopper, devices on said conveyor adapted to engage and carry along said receptacle, a revolving drum, around part of the periphery of which the receptacles are conveyed by the conveyor, and by which the conveyor is moved to a position to discharge the receptacles with their open ends directed upwardly, and means adjacent the upper part of the hopper for causing receptacles to present their open ends to the carrying devices on the conveyor around the drum, or return said receptacles to the hopper.

2. In mechanism for feeding and conveying open receptacles, the combination of a hopper to receive the receptacles, a conveyor movable in said hopper, devices on said conveyor adapted to engage and carry along the receptacles, a brush in the hopper adapted to engage the receptacles to bring them into proper position for engagement of their open ends by the conveyor devices or cause their return to the hopper, and a revolving drum around part of the periphery of which the receptacles are conveyed by the conveyor, and by which the conveyor is moved to a position to discharge the receptacles with their open ends directed upwardly.

3. In mechanism for feeding and conveying open receptacles, the combination of a hopper to receive the receptacles, a conveyor movable in said hopper, devices on said conveyor adapted to engage and carry along the receptacles, a revolving drum around part of the periphery of which the receptacles are conveyed by the conveyor, and by which the conveyor is moved to a position to discharge the receptacles with their open ends directed upwardly, an adjustable guard extending about part of the drum for retaining the receptacles on the conveyor for the required distance, and a brush adjacent the upper part of the hopper for causing receptacles to present their open ends to the carrying devices on the conveyor around the drum, or return them to the hopper.

4. In mechanism for feeding and conveying open receptacles, the combination of a hopper to receive the receptacles, a conveyor movable in said hopper, devices on said conveyor adapted to enter the open ends of said receptacles, a revolving drum, around part of the periphery of which the receptacles are conveyed by the conveyor, and by which the conveyor is moved to a position to discharge the receptacles with their open ends directed upwardly, an inclined table receiving the receptacles from the conveyor, means for imparting shaking movements to said table to feed the receptacles therealong, and means co-operating with the latter for spacing and aligning the receptacles before they leave the table.

5. In mechanism for feeding and conveying open receptacles, the combination of a hopper to receive the receptacles, a conveyor movable in said hopper, devices on said conveyor adapted to enter the open ends of said receptacles, a revolving drum around part of the periphery of which the receptacles are conveyed by the conveyor, and by which the conveyor is moved to a position to discharge the receptacles with their open ends directed upwardly, an inclined table receiving the receptacles from the conveyor, means for imparting shaking movements to said table to feed the receptacles therealong, and means co-operating with the latter for spacing and aligning the receptacles before they leave the table, said spacing and aligning means also serving to positively feed the receptacles from the table.

In witness whereof we have signed this specification.

WILLIAM EDWARD PRESCOTT.
JOHN EDWARD POINTON.